Aug. 9, 1932.  E. C. DAMROW  1,870,494
CENTRIFUGAL FRICTION CLUTCH
Filed Dec. 11, 1931
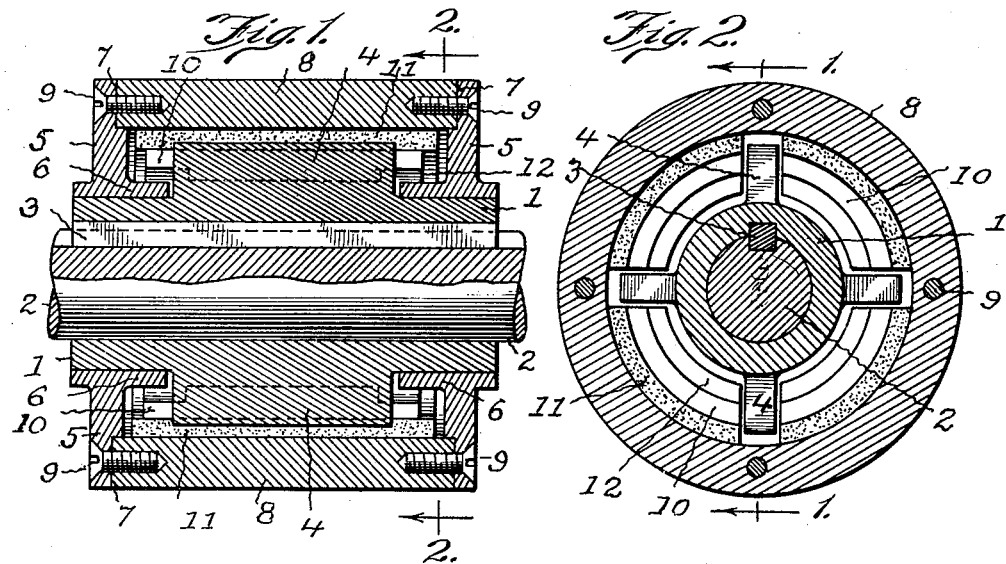
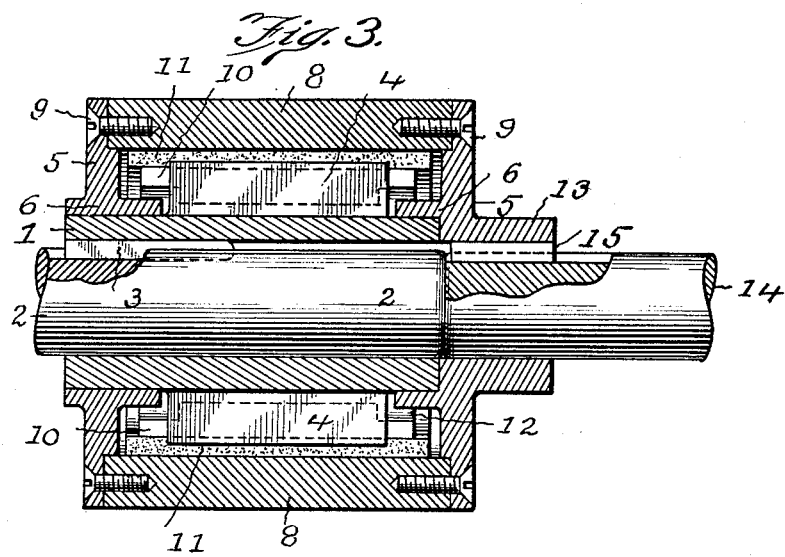
INVENTOR:
EDWARD C. DAMROW,
BY
Robert Burns
ATTORNEY.

Patented Aug. 9, 1932

1,870,494

UNITED STATES PATENT OFFICE

EDWARD C. DAMROW, OF FOND DU LAC, WISCONSIN, ASSIGNOR TO DAMROW BROTHERS COMPANY, OF FOND DU LAC, WISCONSIN, A CORPORATION OF WISCONSIN

CENTRIFUGAL FRICTION CLUTCH

Application filed December 11, 1931. Serial No. 580,375.

This invention relates to that type of friction clutches in which a plurality of radially movable friction shoes carried by a central hub and enclosed by an annular shell or casing, are adapted under a high speed rotation of the central hub to have gradually increasing frictional engagement with the inner circular wall of the shell or casing. And this improvement has for its object:

To provide a structural formation and combination of parts in the centrifugal type of friction clutches above referred to, involving the features of simplicity, durability and efficiency in operation, all as will hereinafter more fully appear.

In the accompanying drawing:

Fig. 1 is a central longitudinal section on line 1—1 of Fig. 2 illustrating the invention in its adaptation to the pulley driven type of clutches.

Fig. 2 is a transverse sectional elevation on line 2—2 of Fig. 1.

Fig. 3 is a central longitudinal sectional elevation, illustrating the invention in its adaptation to the shaft driven type of clutches.

Like reference numerals indicate like parts in the different views.

In this improvement a hub 1 of the sleeve type is fixedly secured on the driving shaft 2 by a spline 3 or other usual fastening means. and is formed with a plurality of radially extending blades 4, and in the construction shown, the blades 4 are of a less length than the main portion of their carrying hub portion so as to leave free circular bearing spaces at the respective ends of the same for revoluble support of the hereinafter described driven member of the clutch structure.

The driven clutch member just referred to has a sectional formation comprising a pair of end heads 5 formed with inner annular flanges 6 to afford extended bearings on the above described free ends of the driving hub 1, and at their outer margins said heads are formed with annular grooves 7 for the reception of the respective ends of annular shell 8, with a view to maintain the inner circular face of the shell in concentric relation to axis of rotation of the clutch. The parts being fixedly connected together by attaching screws 9 or other usual connecting means in the assemblage together of the clutch parts.

The intermediate engaging means between the above described driving and driven members of the clutch structure comprises a plurality of approximately quadrantal shaped friction shoes 10 arranged loosely in the spaces between the radial blades 4 of the driving hub 1, and having curved outer faces adapted for frictional contact with the inner circular face of the annular shell 8 aforesaid. Such contact faces of the shoes 10 is preferably formed by layers 11 of a material having increased frictional properties as the brake linings now in general use.

As usual in the centrifugal type of friction clutches, as the speed of rotation of the driving hub 1 increases, a like outward centrifugal tendency on the part of the friction shoes 10 is created to cause frictional engagement of the same with the inner circular face of the annular shell 8 of the driven clutch member, with such engagement taking place in a gradual manner until the driven and the driving members of the clutch rotate in unison.

In the construction shown, the respective ends of the friction shoes 10 have their inner portions cut away to provide end recesses, 12, adapted to clear the adjacent bearing flanges 6 of the end heads 5, of the driven clutch member, and thus permit the outer portions of the shoes to have a maximum degree of length and consequent frictional engagement surfaces.

In the type of this invention shown in Fig. 1, shaft 1 is the driving element, while the annular shell 8 is the driven element, with its circular perimeter adapted to receive an endless belt by which motion is communicated to a machine or appliance requiring a gradual starting operation. And in such construction both end heads 5 of the driven member of the clutch are of counterpart formation as shown.

In the type of this invention shown in Fig. 3, the shaft 1 is also the driving element, and the concentric shell 8 and end heads 5 constitute the driven element, with the only difference between the above described types of the clutch structure, being the special formation of one end head 5, with a hub extension 13 in which the end of a driven shaft 14 is fixedly secured by a spline 15 or like fastening means, and in longitudinal alignment with the driving shaft 2, aforesaid.

Having thus fully described by invention what I claim as new, is:—

A centrifugal clutch comprising in combination, a driving shaft, a sleeve like hub secured on said shaft and provided with a plurality of radially extending blades, a driven member comprising end heads journalled by annular flanges on said hub, and an annular sleeve fixedly attached at its respective ends to said heads, and a plurality of approximately quadrantal shaped friction shoes arranged loosely in the spaces between the aforesaid blades and having curved outer faces adapted for frictional engagement with the inner circular face of the shell of the driven clutch member, the friction shoes being under cut at their ends to overhang the annular flanges of the end heads and affording a maximum longitudinal extent of frictional contact surface in the shoes and a maintenance of the same in adjacent relation to the driven member in an inactive condition of the mechanism.

In testimony whereof I hereunto affix my signature.

EDWARD C. DAMROW.